US006836897B2

(12) United States Patent
Yee

(10) Patent No.: US 6,836,897 B2
(45) Date of Patent: Dec. 28, 2004

(54) DEVICE AND METHOD FOR REMOVING CONTAMINANT PARTICLE FROM OPTICAL DISK

(75) Inventor: Young Joo Yee, Kyunggi-do (KR)

(73) Assignee: LG Electronics Inc., Seoul (KR)

(*) Notice: Subject to any disclaimer, the term of this patent is extended or adjusted under 35 U.S.C. 154(b) by 63 days.

(21) Appl. No.: 10/322,447

(22) Filed: Dec. 19, 2002

(65) Prior Publication Data

US 2003/0117927 A1 Jun. 26, 2003

(30) Foreign Application Priority Data

Dec. 21, 2001 (KR) ................................ 10-2001-0082699

(51) Int. Cl.[7] ................................................. G11B 7/24
(52) U.S. Cl. ..................................................... 720/719
(58) Field of Search ................... 369/72, 73; 360/97.02

(56) References Cited

U.S. PATENT DOCUMENTS 4,173,348 A * 11/1979 Dholakia ..................... 369/74

* cited by examiner

Primary Examiner—David Davis
(74) Attorney, Agent, or Firm—Fleshner & Kim, LLP

(57) ABSTRACT

Device and method for removing contaminant particles from an optical disk, the optical disk having an optical disk substrate, a reflective layer on the disk substrate, a first insulating layer on the reflective layer, a recording layer on the first insulating layer for recording/reproducing a data thereon/therefrom, and a second insulating layer on the recording layer, the device including an electrode pattern of a plurality of concentric circles on the optical disk except the recording layer, a third insulating layer on the electrode pattern to expose a region of the electrode pattern, and a number of connection electrodes in contact with the exposed electrode pattern for applying dust collecting voltages to the electrode pattern.

16 Claims, 2 Drawing Sheets

DEVICE AND METHOD FOR REMOVING CONTAMINANT PARTICLE FROM OPTICAL DISK

This application claims the benefit of the Korean Application No. P 2001-82699 filed on Dec. 21, 2001, which is hereby incorporated by reference.

BACKGROUND OF THE INVENTION

1. Field of the Invention

The present invention relates to device and method for removing contaminant particles from an optical disk.

2. Background of the Related Art

Recently, the development of a broad band multimedia environment inclusive of clearer video information and wide band audio signals, and the wide spread of PDAs and picture telephone, and the like require significant increase information capacity to be processed, handled and stored in those devices. Moreover, there have been ceaseless improvements of recording densities of magnetic information recording media, such as a small sized, and light weighted large capacity information storage devices, and hard discs used as a supplementary memory of a computer, and the like, and there have been various researches for increasing a recording density of an optical recording device, such as CD, and DVD.

Especially, the optical recording device has a system in which an optical disc, the recording medium, is in general detachable, to permit use of various contents, and make data storage, copy, and distribution easy.

The large capacity information storage device requires a high recording density, which in turn implies a small size of a data unit bit. Moreover, as one of pickup head fitted with a near-field optical system by using an aerodynamic buoyancy, which is one of pickup of a near-field optical system, a flying type slider head may be used for maintaining a gap to a recording film on a disk closer than a wavelength of an input laser beam.

For the maintenance of a near-field gap by means of the flying type slider structure, a functional structure of the slider which can secure a stable buoyancy in view of fluid dynamics is very important. Under this condition, if mounting/dismounting of the optical disk on/off a drive having the optical pickup fitted thereto is kept on, a surface of the optical disk is liable to be contaminated with an external contamination source of an external environment.

The contamination of a data bit part optical information is to be recorded thereon/reproduced therefrom may result in a situation the data is read wrongly, or the data can not be read, or new optical information is recorded wrongly, or is impossible to record. Particularly, in the case of a near-field optical recording device which has a very small gap between the recording surface of the optical disk and the optical pickup head, since the contamination of a data bit part, not only degrades the optical recording/reproducing performance of optical information, but also impedes the flying function of the optical pickup head seriously, the contamination of a data bit part is a major cause that drops reliability of recording/reproducing performance of entire optical recording device, significantly.

In a case of current optical information storage devices, such as CD and DVD which employ a far-field optical system, no particular contamination removal technique has been applied thereto. In a case of high density optical information storage devices under development, either a method is applied, in which the optical disk and the pickup drive are hermetically assembled such that the optical disk can not be dismounted for prevention of contamination, or a method is suggested, in which the optical disk is enclosed in a special cartridge which can reduce infiltration of contaminant, such as dusts, and the optical disk is mounted/dismounted to the optical pickup drive in a form of the cartridge, for maintaining the advantage of the optical disk.

However, it is very difficult to secure a long term reliability of optical information since a perfect cutting off infiltration of micro contaminants is very difficult, and a probability of contamination becomes very high as a number of times of use increases.

As the data recording density is increasing, a structure of the optical disk is developing into a form an optical recording layer required for recording and reproduction is formed on a surface of the optical disk a beam is incident thereto, and a size of an optical information mark to be recorded/reproduced is also reduced. Particularly, the feature of mounting/dismounting of the optical disk, that permits the optical disk to be carried more conveniently, distribute information more easily, and cost lower, than a magnetic recording device, makes the contamination from an external environment unavoidable.

This situation mounts a hazard of malfunction of the information storage device caused by a surface contamination of the optical disk higher than the optical disk of a current far-field optical system.

SUMMARY OF THE INVENTION

Accordingly, the present invention is directed to device and method for removing contaminant particles from an optical disk that substantially obviates one or more of the problems due to limitations and disadvantages of the related art.

An object of the present invention is to provide device and method for removing contaminant particles from an optical disk, which can enhance reliability of information recording/reproduction on/from an optical disk.

Another object of the present invention is to provide device and method for removing contaminant particles from an optical disk, which can remove contaminant particles from a surface of an optical disk with easy.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the contaminant particles on a surface of an optical disk required for recording, reproduction and flying of an optical pickup head are driven in a particular direction, and removed therefrom by electrophoresis or dielectricphoresis.

Preferably, a plurality of conductive lines of metal, or the like are buried in a part except a region optical information is recoded thereto/reproduced therefrom. The conductive lines have predetermined waveforms applied thereto, owing to which micro particles, a source of contamination of the optical disk, is driven in a desired direction.

Accordingly, alike an optical disk in a near-field optical system, if a recording layer is formed in a substrate surface region, the present invention improves a reliability of an optical recording device having a micro gap between the recording layer and the optical pickup head.

Moreover, the present invention can be used very favorably in removing, or reducing contamination of the optical disk of an optical recording device employing a far-field optical system, such as CD, DVD, and HDVDR, or an optical disk of a near-field optical recording device employing an SIL optical system.

In one aspect of the present invention, there is provided a device for removing contaminant particles from an optical disk having an optical disk substrate, a reflective layer on the disk substrate, a first insulating layer on the reflective layer, a recording layer on the first insulating layer for recording/reproducing a data thereon/therefrom, and a second insulating layer on the recording layer, the device including an electrode pattern of a plurality of concentric circles on the optical disk except the recording layer, a third insulating layer on the electrode pattern to expose a region of the electrode pattern, and a number of connection electrodes in contact with the exposed electrode pattern for applying dust collecting voltages to the electrode pattern.

Preferably, the connecting electrodes are in contact with electrode patterns at predetermined fixed intervals, and the number of the connection electrodes are two or more than two.

Preferably, the connection electrodes are perpendicular to the electrode pattern of the optical disk, further includes pads in contact with the connecting electrodes, and the pads are in a hub part at a central part of the optical disk.

The number of connection electrodes apply AC signals of different phases to adjacent electrode patterns as dust collecting drive voltages. The connection electrodes include a predetermined number of independent power sources for supplying the dust collecting drive voltages to the predetermined number of connection electrodes.

Preferably, the device for removing: contaminant particles further includes an edge triggered flipflop for providing AC signals of predetermined frequencies in response to the same clock generating signals, and a voltage amplifier for receiving and amplifying, the AC signals from the edge triggered flipflop for providing the dust collecting drive voltages to the connection electrodes.

Preferably, the device for removing contaminant particles further includes a wiper fitted to a part of the optical disk for removing particles collected to a predetermined region of the optical disk from the optical disk.

In another aspect of the present invention, there is provided a method for removing a contaminant particle from an optical disk, comprising the step of electrically collecting the contaminant particle from a surface of an optical disc in a direction of a hub or an edge of the disc by applying driving voltages to an electrode pattern of the optical disc through connection electrodes, wherein the electrode pattern electrically connected to the connection electrode and dielectrically connected to a recording layer of the disc is concentrically formed on the recording layer.

Preferably, the connection electrode applies AC signals having different phases for collecting the contaminant particles, and the AC signals are any one of square wave, sinusoidal wave, and triangular wave.

Preferably, the dust collecting drive voltage has a retarded phase depending on a collecting direction of the contaminant particle, an amplitude fixed based on intervals of the electrodes, and a duty ratio of the driving voltage is fixed based on electrical characteristics of the contaminant particles.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

The present invention suggests collecting micro contaminant particles from a surface of a disk in a particular direction by using so called electrophoresis. The electrophoresis is widely used in a bio-medical field for separating a particular cell from electrolyte, and also used for separating a desired particle by means of electrodes or an array of electrodes of a required voltage difference.

In the device and method for removing contaminant particles from an optical disk of the present invention can drive micro contaminant particles fallen on a surface of the optical disk from a part the optical information is recorded thereon/reproduced therefrom to a predetermined region not related to optical recording, such as an edge of the optical disk.

Especially, a technique of contaminant removal of the present invention assures a stable flying performance of an optical pickup head, and prevents a small optical pickup head suffering from damage, when the technique of contaminant removal of the present invention is applied to a high density optical recording device which records and reproduces optical information, with a micro gap to the surface of a recording layer of the optical disk maintained, like a flying type optical pickup head of a near-field optical system employing an SIL (Solid Immersion Lens).

Figure 1:
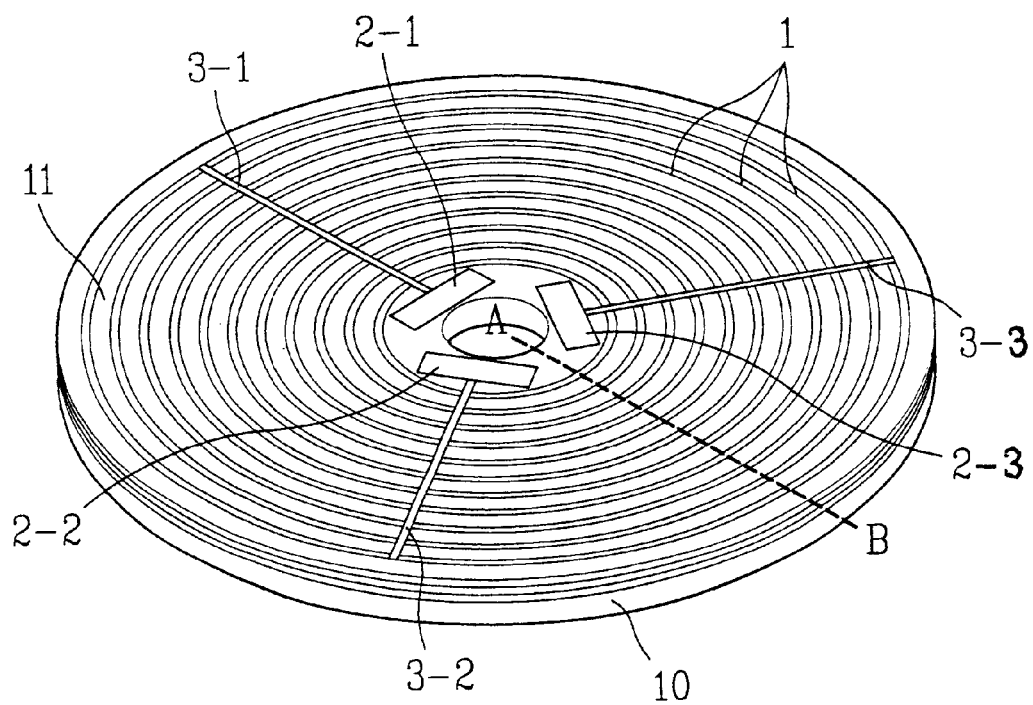
FIG. 1 illustrates a perspective view of an optical disk having a contaminant particle removal function applied thereto in accordance with a preferred embodiment of the present invention, schematically.
Figure 2:
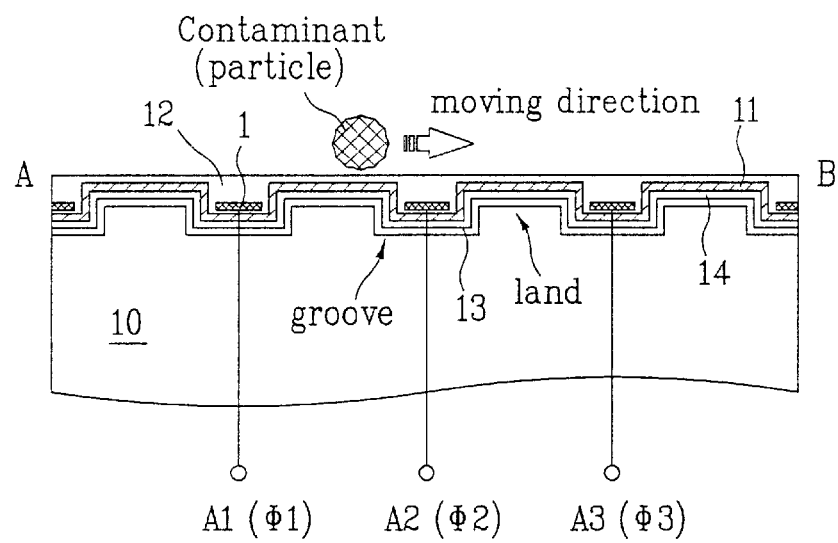
FIG. 2 illustrates a section of the optical disk across a line A-B in FIG. 1.

FIG. 1 illustrates a perspective view of an optical disk having a contaminant particle removal function applied thereto in accordance with a preferred embodiment of the present invention schematically, wherein a three phase drive voltage is applied for driving contaminant particles to an edge of an optical disk by electrophoresis. FIG. 2 illustrates a section of the optical disk across a line A-B in FIG. 1, wherein a dust collecting pattern 1 is formed insulated from a recording layer 11 on a surface of an optical disk substrate 10 for continuous occurrence of a movement of micro particles by electrophoresis.

The dust collecting pattern 1 is patterned such that the dust collecting pattern 1 is positioned repeatedly at predetermined intervals in parts except the optical information is recorded thereon.

In more detail, referring to FIGS. 1 and 2, the device for removing contaminant particles from an optical disk includes a recording layer 11 on a surface of an optical disk substrate 10 for recording/reproducing a data thereon/therefrom, a dust collecting electrode pattern 1 of concentric circles for continuous occurrence of movements of micro contaminant particles by electrophoresis, and connection electrodes 3-1, 3-2, and 3—3 and pads 2-1, 2—2, and 2-3 for electrically connecting the electric patterns 1 waveforms with identical phase are to be applied thereto so that adjacent electrode patterns 1 have different dust collecting drive voltage waveforms with different phases applied thereto, and for connecting a power source to the electrode patterns 1.

The device for removing contaminant particles from an optical disk also includes a required number of independent power sources for supplying the dust collecting drive voltages.

The device for removing contaminant particles from an optical disk is connected to the independent power sources for providing the dust collecting voltage, and the independent power source includes a circuit having logical circuits, such as edge triggered flipflop and binary counter and the like for obtaining identical clock (CLK) waveforms, and a voltage amplifier combined therein.

The device for removing contaminant particles from an optical disk further includes a wiper for removing particles collected in a predetermined region of the optical disk.

The connecting electrodes 3-1, 3-2, and 3—3 are formed perpendicular to the electrode patterns 1 of the optical disk, and the pads 2 are formed in a hub part at a central part of the optical disk.

The electrode patterns 1 for driving dusts are concentric on the optical disk, for collecting the contaminant particles in a radial direction of the optical disk, and formed in a region no optical information is recorded or reproduced.

Though the embodiment shows three connecting electrodes 3-1, 3-2, and 3—3, and pads 2-1, 2—2, and 2-3, numbers of the connecting electrodes and the pads may be fewer, or more.

The connecting electrodes are in contact with the electrode patterns 1 at predetermined equal distances. For an example, referring to FIG. 1, the connecting electrode 3-1 is connected to a (3n+1)th (n=0, 1, - - - ) electrode pattern 1 counted from a center of the optical disk, the connecting electrode 3-2 is connected to a (3n+2)th (n=0, 1, - - - ) electrode pattern 1 counted from the center of the optical disk, and the connecting electrode 3—3 is connected to a (3n+3)th (n=0, 1, - - - ) electrode pattern 1 counted from a center of the optical disk, for applying a dust collecting drive voltage to the electrode patterns 1 through the pads 2-1, 2—2, and 2-3.

Referring to FIG. 2, the optical disk includes a reflection layer 13, a lower insulating layer 14, a recording layer 11 for recording/reproducing a data thereto/therefrom, and an upper insulating layer 12, stacked on a disk substrate 10 in succession.

FIG. 2 illustrates an optical disk structure of a land/groove type substrate, wherein optical information is recorded on a land region and no optical information is recorded on a groove region. Accordingly, the electrode patterns 1 are buried in the upper insulating layer 12 formed in the groove regions.

The dust collecting electrode patterns 1, which causes electrophoresis, are insulated from the recording layer 11 electrically, and are covered with the upper insulating layer 12, thereby being insulated from dust particles, which are sources of contamination. A part of the upper insulating layer 12 is opened to contact with the connecting electrode 3.

AC signals of different phases are provided to the connecting electrodes 3-1, 3-2, and 3—3 respectively as the dust collecting voltages A1, A2, A3. The AC signal may be one of rectangular wave, sinusoidal wave, and triangular wave.

Figure 3:
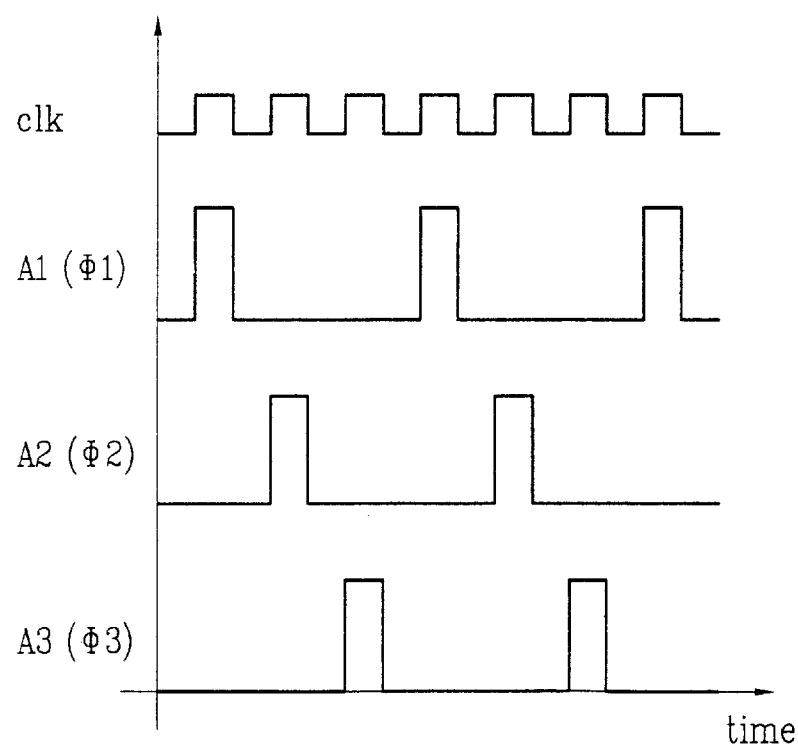
FIG. 3 illustrates examples of waveforms of clock signals and de-dusting drive voltages for implementing a direction of movement of the contaminant particle shown in FIG. 2.

A principle of dust collection of micro particles from the surface of the optical disk of the present invention will be explained; with reference to FIGS. 1, 2, and 3. FIG. 3 illustrates examples of waveforms of clock signals and de-dusting drive voltages for implementing a direction of movement of the contaminant particle shown in FIG. 2.

Referring to FIGS. 2 and 3, the connecting electrodes 3-1, 3-2, and 3—3 provide AC signals of A1, A2, and A3 of $\Phi1$, $\Phi2$ and $\Phi3$ phases to the electrode patterns 1 electrically connected thereto, respectively. The driving voltages A1, A2 and A3 provided to adjacent electrode patterns 1 have different phases, determined depending on a driving direction of the contaminant particles.

That is, referring to FIG. 3, the farther it goes in a direction intended to drive the contaminant particles, the three voltages A1, A2, and A3 have the more delayed phases $\Phi1$, $\Phi2$ and $\Phi3$, with differences of the phases fixed taking a size, and a speed of the contaminant particle, and an efficiency. It is required that amplitudes of the dust collecting drive voltages are determined as appropriate values depending on distances of the electrode patterns 1.

In the meantime, a duty, which is a sustain time period of each of the dust collecting drive voltages respectively provided to the electrode patterns, is dependent on a charge characteristic of the contaminant particle, and fixed by using voltage waveforms obtained by dividing a clock waveform as shown in FIG. 3.

That is, the phases of the dust collecting drive voltages provided to the electrode patterns fix a drive direction of the micro particles. By adjusting an amplitude, a frequency, and a duty of the dust collecting drive voltage, a moving speed of the micro particles and a dust collecting efficiency are fixed.

As has been explained, the device and method for removing contaminant particles from an optical disk have the following advantages.

First, optimized dust collecting drive voltages of different phases are provided to electrode patterns at fixed intervals and connecting electrodes each in contact with an adjacent electrode pattern. According to this, the contaminant particles are driven to an edge, or hub direction from a surface of the optical disk, and removed positively.

Second, the positive elimination of contamination of the optical disk improves recording/reproducing reliability of the optical recording device.

Third, in the case of a high density optical information storage device of a near-field optical system, the optical pickup head, flying at a micro near-field gap from the optical disk, can be made to make a stable flying.

Fourth, damage to the small optical pickup head can be prevented, degradation of optical characteristics of an optical pickup part can be prevented, and, moreover, malfunction in information recording/reproduction can be prevented. Lost of optical information caused by prolonged use and frequent mounting/dismounting can be reduced.

It will be apparent to those skilled in the art that various modifications and variations can be made in the device and method for removing contaminant particles from an optical disk of the present invention without departing from the spirit or scope of the invention. Thus, it is intended that the present invention cover the modifications and variations of this invention provided they come within the scope of the appended claims and their equivalents.

What is claimed is:

1. A device for removing contaminant particles from an optical disk having an optical disk substrate, a reflective layer on the disk substrate, a first insulating layer on the reflective layer, a recording layer on the first insulating layer for recording/reproducing a data thereon/therefrom, and a second insulating layer on the recording layer, the device comprising:

an electrode pattern of a plurality of concentric circles on the optical disk except the recording layer;

a third insulating layer on the electrode pattern to expose a region of the electrode pattern; and a number of connection electrodes in contact with the exposed electrode pattern for applying dust collecting voltages to the electrode pattern.

2. A device as claimed in claim 1, wherein the connecting electrodes are in contact with electrode patterns at predetermined fixed intervals.

3. A device as claimed in claim 1, wherein the number of the connection electrodes are two or more than two.

4. A device as claimed in claim 1, wherein the connection electrodes are perpendicular to the electrode pattern of the optical disk.

5. A device as claimed in claim 1, further comprising pads in contact with the connecting electrodes.

6. A device as claimed in claim 5, wherein the pads are in a hub part at a central part of the optical disk.

7. A device as claimed in claim 1, wherein the number of connection electrodes apply AC signals of different phases to adjacent electrode patterns as dust collecting drive voltages.

8. A device as claimed in claim 7, further comprising a predetermined number of independent power sources for supplying the dust collecting drive voltages to the predetermined number of connection electrodes.

9. A device as claimed in claim 7, further comprising:

an edge triggered flipflop for providing AC signals of predetermined frequencies in response to the same clock generating signals, and a voltage amplifier for receiving and amplifying the AC signals from the edge triggered flipflop for providing the dust collecting drive voltages to the connection electrodes.

10. A device as claimed in claim 1, further comprising:

a wiper fitted to a part of the optical disk for removing particles collected to a predetermined region of the optical disk from the optical disk.

11. A method for removing a contaminant particle from an optical disk, comprising the step of electrically collecting the contaminant particle from a surface of the optical disc in a direction of a hub or an edge of the disc by applying driving voltages to an electrode pattern of the optical disc through connection electrodes, wherein the electrode pattern electrically connected to the connection electrode and dielectrically connected to a recording layer of the disc is concentrically formed on the recording layer.

12. A method as claimed in claim 11, wherein the connection electrode applies AC signals having different phases for collecting the contaminant particles.

13. A method as claimed in claim 12, wherein the AC signals are any one of square wave, sinusoidal wave, and triangular wave.

14. A method as claimed in claim 11, wherein the driving voltage has a retarded phase depending on a collecting direction of the contaminant particle.

15. A method as claimed in claim 11, wherein the driving voltage has an amplitude fixed based on intervals of the electrodes.

16. A method as claimed in claim 11, wherein a duty ratio of the driving voltage is fixed based on electrical characteristics of the contaminant particles.

* * * * *